United States Patent
Kennedy, III et al.

(10) Patent No.: US 9,211,662 B2
(45) Date of Patent: Dec. 15, 2015

(54) MOLD WITH MIDPLATE AND METHOD OF MOLDING GOLF BALL

(75) Inventors: Thomas J. Kennedy, III, Wilbraham, MA (US); Takahisa Ono, Fujisawa (JP); Chin-Shun Ko, Kaohsiung (TW)

(73) Assignee: NIKE, Inc., Beaverton, OR (US)

( * ) Notice: Subject to any disclaimer, the term of this patent is extended or adjusted under 35 U.S.C. 154(b) by 786 days.

(21) Appl. No.: 13/436,493

(22) Filed: Mar. 30, 2012

(65) Prior Publication Data
US 2013/0256946 A1 Oct. 3, 2013

(51) Int. Cl.
| | | |
|---|---|---|
| B29C 43/18 | (2006.01) | |
| A63B 37/00 | (2006.01) | |
| B29C 33/14 | (2006.01) | |
| B29C 33/12 | (2006.01) | |
| A63B 45/00 | (2006.01) | |
| B29C 43/02 | (2006.01) | |
| B29C 43/14 | (2006.01) | |
| B29L 31/54 | (2006.01) | |
| B29C 33/00 | (2006.01) | |

(52) U.S. Cl.
CPC ............. *B29C 43/18* (2013.01); *A63B 37/0003* (2013.01); *A63B 45/00* (2013.01); *B29C 33/12* (2013.01); *B29C 33/14* (2013.01); *B29C 43/027* (2013.01); *B29C 43/146* (2013.01); *B29C 33/0088* (2013.01); *B29C 2043/182* (2013.01); *B29L 2031/546* (2013.01)

(58) Field of Classification Search
USPC ............... 264/250, 251, 254, 263, 275, 279.1
See application file for complete search history.

(56) References Cited

U.S. PATENT DOCUMENTS

| | | | |
|---|---|---|---|
| 1,481,866 A | | 1/1924 | Heist |
| 1,939,894 A | | 12/1933 | Goodwin |
| 2,354,017 A | | 7/1944 | Hazell |
| 2,363,059 A | | 11/1944 | Greene et al. |
| 2,363,086 A | | 11/1944 | Ryan |
| 2,376,084 A | | 5/1945 | Radford |
| 2,998,977 A | | 9/1961 | Molitor |
| 3,147,324 A | | 9/1964 | Ward |
| 3,287,767 A | * | 11/1966 | Ford et al. ................... 425/129.1 |
| 4,501,715 A | | 2/1985 | Barfield et al. |
| 4,508,309 A | | 4/1985 | Brown |
| 5,006,297 A | * | 4/1991 | Brown et al. .................. 264/234 |
| 5,184,828 A | | 2/1993 | Kim et al. |
| 5,849,237 A | | 12/1998 | Inoue |
| 5,961,401 A | | 10/1999 | Masutani et al. |
| 6,036,907 A | | 3/2000 | Tanaka et al. |

(Continued)

FOREIGN PATENT DOCUMENTS

WO    WO-00/13874 A1    3/2000

OTHER PUBLICATIONS

International Search Report and Written Opinion mailed Jul. 26, 2013 for PCT Application No. PCT/US2013/034569.

*Primary Examiner* — Atul P. Khare
(74) *Attorney, Agent, or Firm* — Honigman Miller Schwartz and Cohn LLP; Matthew H. Szalach; Jonathan P. O'Brien

(57) ABSTRACT

A mold for manufacturing hemispherical sections for a golf ball includes a first mold plate including a first cavity, a second mold plate including a second cavity, and a midplate. The midplate includes an indentation on a first side of the midplate and a projection on a second side of the midplate. The indentation of the midplate corresponds to the first cavity of the first mold plate. The projection of the midplate corresponds to the second cavity of the second mold plate.

14 Claims, 15 Drawing Sheets

(56) References Cited

U.S. PATENT DOCUMENTS

| | | |
|---|---|---|
| 6,071,201 A | 6/2000 | Maruko |
| 6,093,357 A | 7/2000 | Bissonette et al. |
| 6,096,255 A | 8/2000 | Brown et al. |
| 6,290,797 B1 | 9/2001 | Gosetti et al. |
| 6,315,682 B1 | 11/2001 | Iwami et al. |
| 6,319,451 B1* | 11/2001 | Brune .................... 264/278 |
| 6,379,269 B1 | 4/2002 | Nesbitt et al. |
| 6,436,327 B1 | 8/2002 | Cloutier et al. |
| 6,468,381 B1* | 10/2002 | Morgan ................ 156/244.19 |
| 6,544,131 B1 | 4/2003 | Sano et al. |
| 6,562,912 B1 | 5/2003 | Sullivan et al. |
| 6,669,581 B2 | 12/2003 | Iwami |
| 6,695,718 B2 | 2/2004 | Nesbitt |
| RE38,589 E | 9/2004 | Hiraoka et al. |
| 7,204,946 B2* | 4/2007 | Moore .................... 264/148 |
| 7,452,288 B2 | 11/2008 | Nagasaki et al. |
| 7,938,744 B2 | 5/2011 | Umezawa et al. |
| 2001/0048180 A1* | 12/2001 | Cupples .................... 264/275 |
| 2002/0066976 A1 | 6/2002 | Cloutier et al. |
| 2003/0125135 A1 | 7/2003 | Iwami et al. |
| 2003/0230825 A1 | 12/2003 | Moore |
| 2004/0130064 A1 | 7/2004 | Ninomiya et al. |
| 2006/0068938 A1 | 3/2006 | Sullivan |
| 2011/0172032 A1 | 7/2011 | Umezawa et al. |
| 2011/0312441 A1 | 12/2011 | Sullivan et al. |
| 2013/0140734 A1* | 6/2013 | Chou et al. .................... 264/241 |
| 2013/0285287 A1* | 10/2013 | Ko et al. .................... 264/319 |

\* cited by examiner

MOLD WITH MIDPLATE AND METHOD OF MOLDING GOLF BALL

BACKGROUND

A wide range of technologies related to the design and manufacture of golf balls are known in the art. The material selected depends on the play conditions desired for the ball. The core material selected affects how the ball performs and how a golfer perceives the feel of the ball. It is desirable that the ball has a certain degree of compression and durability.

For instance, some golfers desire balls that have a lower compression. A lower compression golf ball has a better perceived "feel" when struck by a golf club. The "feel" component is typically related to a lower frequency sound when the ball is struck.

A lower compression golf ball will have good "feel" when struck with a golf dub but may suffer from a lower coefficient of restitution (COR) or high speed resilience. Also, as the golf ball is struck with a higher club head speed, the golf ball with lower compression will tend to deform to a larger degree, robbing the golf ball of distance. It is thus advantageous to build golf balls that have multiple core layers where one portion of the core is devoted to COR and another portion of the core is devoted to "feel".

The spin of a golf ball is also very important for generating lift, due to Bernoulli's principle, in flight and control on short shots into the green. Varying the hardness, thickness and COR of the various layers in a multi-layer golf ball core allows the spin attributes to be tuned to the optimum playability while maintaining excellent "feel" and COR.

A designer may select a harder core material and in other instances the designer may select a softer core material, with the golf ball being made of various materials. Balls that have compatible layers will have a relatively longer life expectancy than balls that are made of layers that are incompatble. For example, if a ball is formed with too hard an outer layer and too soft a core layer, the outer layer will crack relatively early in the life of the golf ball and will create dissatisfaction on the part of golfers using the ball. This is known as a modulus mismatch.

The molding of thermoplastic materials with thermoset materials presents a challenge in that the coefficient of thermal expansion (CTE) is typically different between the thermoset material and the thermoplastic material, thus causing differential expansion and molding issues. Mitigating this CTE mismatch is important.

The centering of an inner core within an outer core is no small feat. It requires consistent materials, excellent control over molding conditions and precise molding tools. Also, the workpiece shapes, sometimes called slugs or preforms, are important as to how the materials fill out the mold during compression molding operations. Ill-formed workpieces in an uncured state will lead to voids and non-centered parts due to poor processing during the compression and curing cycle.

Machines and methods have been developed to manufacture golf balls made of multiple components made of different materials. The different materials within a golf ball may provide different properties that address the considerations noted above. However, the machines and methods to make golf balls made of different materials may experience challenges during manufacture.

SUMMARY

A mold and method for manufacturing a compression-molded article is disclosed. The compression-molded article may be a component used to make a golf ball, such as a dual core of a golf ball including an inner core and an outer core. A mold used to make the compress-molded article may include a first mold plate with a first cavity, a second mold plate with a second cavity, and a midplate. The midplate may include one or more indentations on a first surface and one or more projections on a second surface. The indentations may have a concave shape while the projections may have a convex shape.

A portion of the second surface of the midplate may form a surface against which the preform is molded within the second cavity. The portion of the second surface may extend from the projection to where the midplate and the second mold plate contact when the mold is closed. The portion of the second surface may be substantially flat. The substantially flat portion of the second surface may be without projections or indentations.

During a molding process, an inner core is placed within the mold, along with material to form hemispherical sections. The inner core may be placed within an indentation of the midplate. The inner core may consist essentially of a rubber or a thermoplastic polymer. For instance, the inner core may be formed of a thermoplastic material. The material to form hemispherical sections may be a thermoset material. Workpieces for a hemispherical section may be extruded into a first shape to provide a preform that is subsequently molded into the hemispherical section. A preform placed within a cavity of a mold may have the first shape so that the preform remains in the first shape prior to the mold closing. The workpiece may be extruded into a first shape and then subsequently be molded into a second "preform" shape so that the preform placed within a cavity of a mold has the second shape prior to the mold closing.

The material to form hemispherical sections may be placed within respective cavities of the first mold plate and the second mold plate. The workpiece/slug/preform to form a hemispherical section may be placed within a cavity so that the material is in direct contact with the inner core. A preform may have a first surface facing the inner core when the preform is placed in a cavity of a mold. Direct contact may be provided by a center of the first surface of the preform coming into direct contact with the inner core before a perimeter of the first surface comes into direct contact with the inner core. The preform may have a second surface which contacts the cavity of the mold when the preform is placed within the cavity. Direct contact may be made between the material to form a hemispherical section and the inner core before deformation of material begins. Further, the material to form a hemispherical section may be placed within a cavity so that the material is in direct contact with the inner core and in direct contact with a mold plate.

The hemispherical sections are subsequently melded together to form an outer core that encases an inner core. The material to form hemispherical sections may be in the form of preforms. More preferably, the material to form the hemispherical sections may be in the form of hemispherical performs so as to mitigate the inclusion of voids and the misalignment of the inner core. The inner core serves as a molding surface so that material to form a hemispherical section is molded about the inner core. The inner core and hemispherical section molded about inner core may be joined together as a single piece by the molding operation. The joined hemispherical section/inner core and another hemispherical section may then be placed in a mold and molded together to produce a dual core with an inner core and an outer core encasing the inner core. The joined hemispherical section/inner core and another hemispherical section may also be molded together in the same mold used to mold the hemispherical section and inner core together by removing the midplate and closing the mold a second time. After the hemispherical sections and inner core have been molded into a dual-layer core, one or more additional layers may be molded onto the dual-layer core.

In one aspect, a mold for manufacturing hemispherical sections for a golf ball includes a first mold plate, a second mold plate, and a midplate. The first mold plate may include a first cavity. The second mold plate may include a second cavity. The midplate may include an indentation on a first surface of the midplate and a projection on a second surface of the midplate. The indentation of the midplate may correspond to the first cavity of the first mold plate. The projection of the midplate may correspond to the second cavity of the second mold plate. A portion of the second surface of the midplate may form a surface against which the preform is molded within the second cavity. The portion of the second surface may extend from the projection to where the midplate and the second mold plate contact when the mold is closed. The portion of the second surface may be substantially flat.

In another aspect, a method of manufacturing a golf ball core may include injection molding an inner core. The inner core may be formed of a thermoplastic material. An inner core may be placed in an indentation of a midplate. The midplate may have a first side and a second side. The indentation may be formed on the first side of the midplate. A first preform may be placed within a first cavity of a first mold plate. The first cavity may be positioned opposite to the indentation. The preform may be made of a thermoset material. A second preform may be placed within a second cavity of a second mold plate. The second cavity may be positioned opposite the second side of the midplate. The mold may be closed so that the first preform molds about the inner core and the second preform molds into a hemispherical shape.

In another aspect, a method of manufacturing a golf ball may include placing an inner core within a mold. The mold may include a first mold plate, a midplate including an indentation, and a second mold plate. The inner core may be placed within the indentation of the midplate. A first preform to be molded into a hemispherical section may be placed within a first cavity of the first mold plate. The first preform may have a first surface facing the inner core when the first preform is placed in the first cavity and a second surface which contacts the first cavity when the first preform is placed within the first cavity. The method may further include initiating closing of the mold so that a center of the first surface comes into direct contact with the inner core before a perimeter of the first surface comes into direct contact with the inner core. The mold may be closed to conform the first preform to the inner core and form the first preform into a first hemispherical section.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments described herein regard a mold and method for manufacturing a compression-molded article is disclosed. The compression-molded article may be a component used to make a golf ball, such as a hemispherical section in combination with an inner core. The mold may further produce a second hemispherical section in addition to the combination of a hemispherical section/inner core. The mold may include a first mold plate, a second mold plate, and a midplate. The midplate may include one or more indentations on a first surface and one or more projections on a second surface. The indentations may have a concave shape while the projections may have a convex shape.

During a molding process, an inner core is placed within the mold, along with material to form hemispherical sections. The inner core may be placed within an indentation of the midplate. The material to form hemispherical sections may be placed within respective cavities of the first mold plate and the second mold plate. The hemispherical sections are subsequently molded together to form an outer core that encases an inner core. The material to form hemispherical sections may be in the form of preforms. The inner core serves as a molding surface so that material to form a hemispherical section is molded about the inner core. The inner core and hemispherical section molded about inner core may be joined together as a single piece by the molding operation. Such a molding operation may be utilized to provide a dual core with improved concentricity and greater efficiency.

First, a discussion will be provided regarding golf ball constructions before discussing how multi-piece constructions having an inner core and outer core are generally made. Solid golf balls traditionally have multiple layers. While it is possible to use a golf ball that is made of one solid material, such a one-piece ball typically exhibits low-performance because golf balls having multiple layers are typically designed to allow a golfer to strike the ball such that it would fly longer or with greater control than a ball made of one solid material. Each layer of a golf bail is selected to provide one or more key characteristics for the golfer. The present embodiments also include multiple layers.

To provide a golf ball with a range of properties not normally exhibited by a one-piece solid golf ball, golf balls having a multi-piece construction have been developed. The different pieces of a multi-piece golf ball may be made of different materials that perform in different ways. For example, one piece of a multi-piece golf ball may provide a desired compression, while another piece may provide a durable cover. Exemplary embodiments of multi-piece golf balls will now be reviewed.

Figure 1:
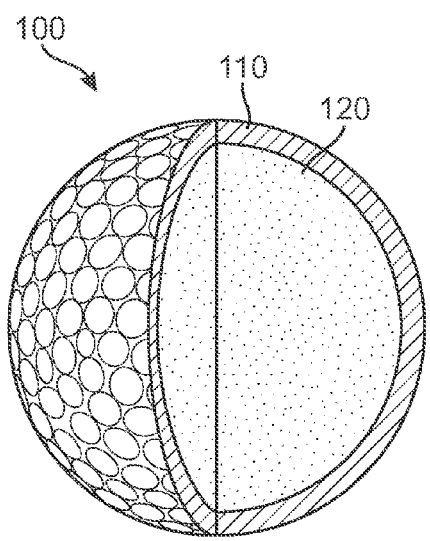
FIG. 1 shows a first representative golf ball in accordance with this disclosure, the golf ball being of a two-piece construction.

FIGS. 1-4 show various embodiments of multi-piece golf balls in accordance with this disclosure. FIG. 1 shows a first golf ball 100 having aspects in accordance with this disclosure. Golf ball 100 is a two-piece golf bail. Specifically, golf ball 100 includes cover layer 110 substantially surrounding core 120. Cover layer 110 may be formed of any golf bail cover material known in the art, which in some embodiments maybe a relatively soft but durable material. For example, cover layer 110 may be formed of a material that compresses/flexes when struck by a golf club, in order to provide spin of the ball and feel to the player. Although relatively soft, the material may also be durable, in order to withstand scuffing from the club and/or the golf course.

FIG. 1 illustrates the outer surface of cover layer 110 as having a generic dimple pattern. While the dimple pattern on golf bail 100 may affect the flight path of golf ball 100, any suitable dimple pattern may be used with the disclosed embodiments. In some embodiments, golf ball 100 may be provided with a dimple pattern including a total number of dimples between approximately 250 and 450.

Figure 2:
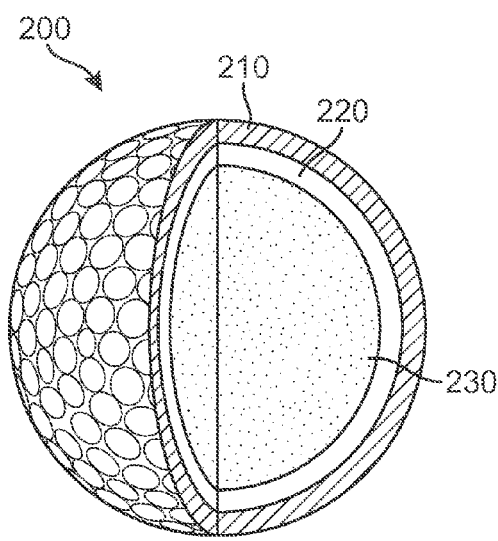
FIG. 2 shows a second representative golf ball, the golf ball having a mantle layer and an outer cover layer.

FIG. 2 shows a second golf ball 200 having aspects in accordance with this disclosure. Golf ball 200 includes a core 230, a mantle layer 220 substantially surrounding core 230, and an outer cover layer 210 substantially surrounding mantle 220.

Figure 3:
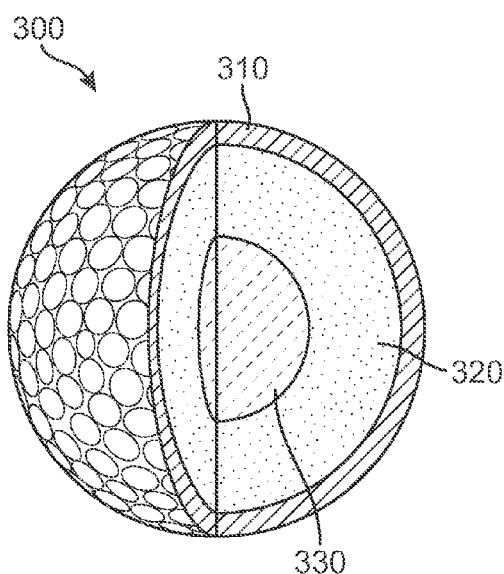
FIG. 3 shows a third representative golf ball, the golf ball having an inner core and an outer core.

FIG. 3 shows a third golf ball 300 having aspects in accordance with this disclosure, where third golf ball 300 has a three-piece construction. Three-piece golf ball 300 includes a first inner core 330, a first outer core 320 substantially surrounding first inner core 330, and a first cover layer 310 substantially surrounding first outer core layer 320.

Figure 4:
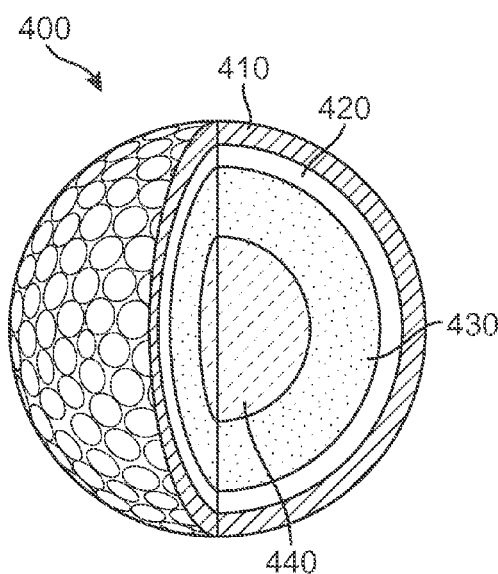
FIG. 4 shows a fourth representative golf ball, the golf ball having an inner core, an outer core, a mantle layer, and an outer cover layer.

FIG. 4 shows a fourth golf ball 400 having aspects in accordance with this disclosure, where fourth golf ball 400 has a four-piece construction. Golf ball 400 includes a second inner core layer 440, a second outer core layer 430 substantially surrounding second inner core layer 440, a mantle layer 420 substantially surrounding outer core layer 430, and an outer cover layer 410 substantially surrounding mantle layer 420.

Generally, the term "core" as used herein refers to at least one of the innermost structural components of the golf ball. The term core may therefore refer, with reference to FIG. 3 but applicable to any embodiment discussed herein, to (1) first inner core 330 only, (2) both first inner core 330 and first outer core 320 collectively, or (3) first outer core 320 only. The term core may also encompass more than two layers if, for example, an additional structural layer is present between first inner core 330 and first outer core 320 or encompassing first outer core 320.

A core may be formed from thermosetting or thermoplastic materials, such as polyurethane, polyurea, partially or fully neutralized ionomers, thermosetting polydiene rubber, such as polybutadiene, polyisoprene, ethylene propylene diene monomer rubber, ethylene propylene rubber, natural rubber, balata, butyl rubber, halobutyl rubber, styrene butadiene rubber or any styrenic block copolymer, such as styrene ethylene butadiene styrene rubber, etc., metallocene or other single site catalyzed polyolefin, polyurethane copolymers, e.g. with silicone.

In addition to the materials discussed above, compositions for portions of a golf ball, such as the core, cover, or any intermediate layer (a layer between the innermost core and the outermost cover layer) may incorporate one or more polymers. Examples of suitable additional polymers include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other materials suitable for use as a material in compositions include polyester elastomers marketed under the tradename SKYPEL by SK Chemicals of Republic of Korea, or diblock or triblock copolymers marketed under the tradename SEPTON by Kuraray Corporation of Kurashiki, Japan, and KRATON by Kraton Polymers Group of Companies of Chester, United Kingdom. All of the materials listed above can provide for particular enhancements to ball layers prepared within the scope of the present invention.

Ionomers also are well suited as a golf ball material, by itself or in a blend of compositions. Suitable ionomeric polymers (i.e., copolymer- or terpolymer-type ionomers) include α-olefin/unsaturated carboxylic acid copolymer-type ionomeric or terpolymer-type ionomeric resins. Copolymeric ionomers are obtained by neutralizing at least a portion of the carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least a portion of carboxylic groups in a terpolymer of an α-olefin, and an α,β-unsaturated carboxylic acid having 3 to 8 carbon atoms, and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Examples of suitable α,β-unsaturated carboxylates include methyl acrylate, ethyl acrylate and n-butyl acrylate. Terpolymeric ionomers include ionomers having varied acid contents and degrees of acid neutralization, neutralized by monovalent or bivalent cations as discussed above. above. Examples of suitable ionomeric resins include those marketed under the name SURLYN® manufactured by E.I. du Pont de Nemours & Company of Wilmington, Del., and IOTEK® manufactured by Exxon Mobil Corporation of Irving, Tex.

Silicone materials also are well suited for use in golf balls, either alone or as a component in a blend of materials. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl, and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanesl dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked dimthylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp, of Midland, Mich., Blensil by GE Silicones of Waterford, N.Y., and Elastosil by Wacker Silicones of Adrian, Mich.

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Dace Chemical Industries, Ltd. of Osaka, Japan.

Next, a general discussion will be provided of how golf balls having an inner core and an outer core are made. Golf balls that include cores formed by multiple pieces, such as first inner core 330 and first outer core 320 of golf ball 300 and second inner core layer 440 and second outer core layer 430 of golf ball 400, may be formed by a multi-step process. For example, first outer core 320 and second outer core layer 430 may be first formed as separately molded sections that are subsequently molded about first inner core 330 and second inner core layer 440, respectively, to form first outer core 320 about first inner core 330 and to form second outer core layer 430 about second inner core layer 440. When made of thermoset materials, such as butadiene (BR), such molded sections may be produced in the form of hemispherical sections or cups which are configured to encase a previously molded inner core when the hemispherical sections are molded about the inner core, causing to the hemispherical sections to join together to form the outer core. Subsequently, the molded combination of outer core and inner core may be further processed to manufacture a golf ball, such as, for example, by grinding off any molding flash, tumbling the outer core inner core combination to roughen its outer surface, and to apply further materials, such as the materials for a mantle and/or a cover.

Figure 5A:
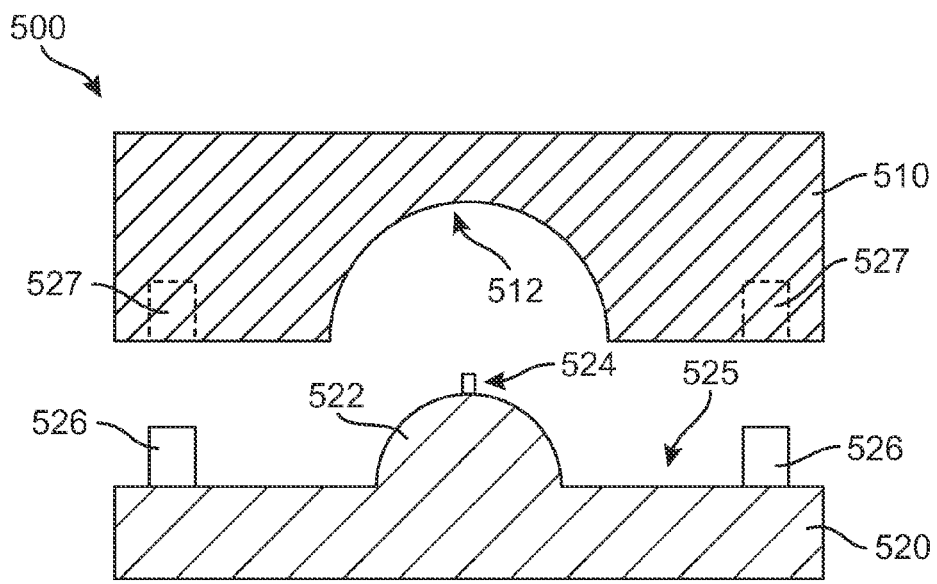
FIG. 5A is a side cross-sectional view of a conventional mold for molding an outer core half, the mold shown in an initial, open position.

FIG. 5A depicts a side sectional view of a conventional mold 500 for producing a hemispherical section of an outer core. Such a hemispherical section may be matched with a corresponding hemispherical section. The two hemispherical sections may be subsequently molded together to produce an outer core, such as outer core 320 of golf ball 300 or outer core layer 430 of golf ball 400, for example. Another part or parts may be positioned between the hemispherical portions as well prior to being molded together. Mold 500 may include an upper mold plate 510 and a lower mold plate 520 for compression molding a material. Lower mold plate 520 may include a projection 522 while upper mold plate 510 may include a cavity 512 that is sized and shaped to receive projection 522. Projection 522 has a shape corresponding to an inner surface of a hemispherical section where an inner core would be located. In such embodiments, projection 522 may be provided as a rounded projection. Cavity 512 has a shape corresponding to an outer surface of the hemispherical section. Lower mold plate 520 may include lugs 526 or other devices for positioning upper mold plate 510 and lower mold plate 520. Upper mold plate 510 may include recesses 527 to receive lugs 526 when mold 500 is closed. In another example, Lugs 526 may be used to provide a gap between upper mold plate 510 and lower mold plate 520 when mold 500 is closed. As will be recognized by those of ordinary skill in the art, lugs 526 may instead be located on upper mold plate 510 and recesses 527 may be located on lower mold plate 520, or lugs 527 and recesses 527 on both upper mold plate 510 and lower mold plate 520.

Figure 5B:
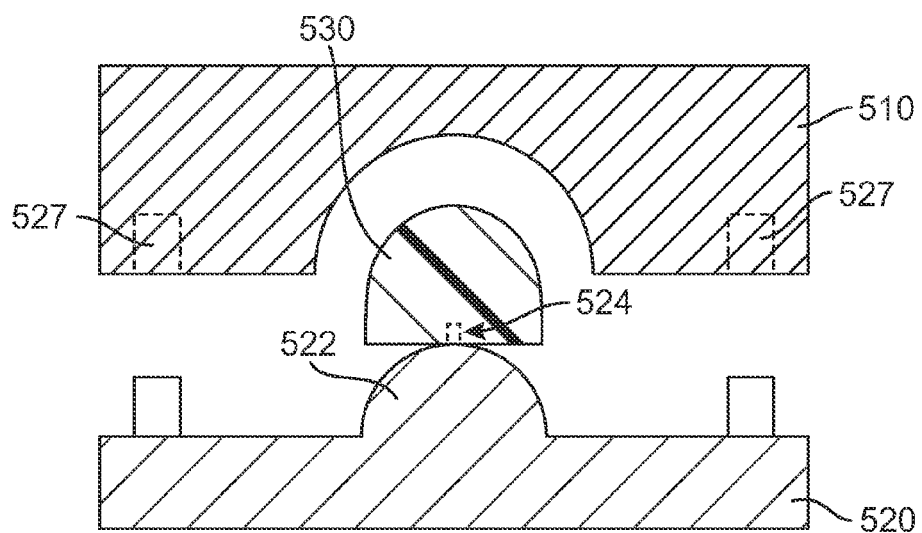
FIG. 5B is a side cross-sectional view of a conventional mold for molding an outer core half after a preform has been introduced, the mold shown in an open position with the mold material positioned within the mold.

As shown in the example of FIG. 5B, a preform 530 is placed within mold 500, between projection 522 and cavity 512, which may serve as a material to be molded. Preform 530 may be a material suitable for molding a hemispherical section subsequently used to mold an outer core layer, such as a thermoset material or any of the other materials discussed above. Preform 530 may be produced, for example, by an extrusion process or other processes used in the art. The extrusion process may include the steps of forcing the material of preform 530 through an aperture and cutting the extruded material to length. Preform 530 may have a shape suitable for use in mold 500, such as a dome shape, cylindrical shape, or other suitable shape. The extrusion aperture may be selected to produced such shapes of preform 530. For instance, the extrusion aperture may be round to provide cylindrical preforms 530 when the extruded material is cut to length. Further, a surface of preform 530 facing and engaging projection 522 may be substantially flat, as shown in FIG. 5B. Such a surface of preform 530 may be without any recess or concavity, as shown in FIG. 5B.

Other preforms appropriate for use in the method described herein include those discussed in U.S. application Ser. No. 13/311,415, filed on Dec. 5, 2011, to Chien-Hsin Chou, et al., which is hereby incorporated by reference in its entirety.

Once preform 530 has been made, such as by an extrusion process, preform 530 may be used in a molding process, such as a process using mold 500, without further shaping or processing of preform 530. In other words, preform 950 may be manufactured into a first shape, such as by extrusion, and when preform 950 is placed within mold 500, preform 950 may still have the first shape so that preform 950 remains in the first shape from manufacture of preform 950 until preform 950 is placed within mold 500. In another example, preform 950 may be made into a first shape, such as by extrusion, and then molded from the first shape into a second shape, so that when preform 950 is placed within mold 500 preform 950 has the second shape prior to mold 500 closing.

To assist in maintaining the position of the preform 530 within mold 500, projection 522 may include a mechanical fastening device 524 to attach preform 530 to projection 522 to a degree. For instance, mechanical fastening device 524 may be a pin that penetrates the material of preform 530, as shown in FIG. 5B, although other fastening devices may be used.

Once preform 530 has been placed within mold 500, mold 500 is closed so that upper mold plate 510 and lower mold plate 520 are brought together to form a hemispherical section (not shown). Upper mold plate 510 and lower mold plate 520 may move along guide rods, be hinged, or actuated by other devices (not shown) enabling at least one of upper mold plate 510 and lower mold plate 520 to move relative to the other to close mold 500. Closing mold 500 causes preform 530 to be deformed between upper mold plate 510 and lower mold plate 520, particularly on the outer surface of projection 522 and within cavity 512, although preform 530 may bulge outward to a degree within a gap provided between upper mold plate 510 and lower mold plate 520. According to an embodiment, at least one of upper mold plate 510 and lower mold plate 520 may be heated to assist with deformation of preform 530 and/or to partially cure the material of preform 530.

Figure 5C:
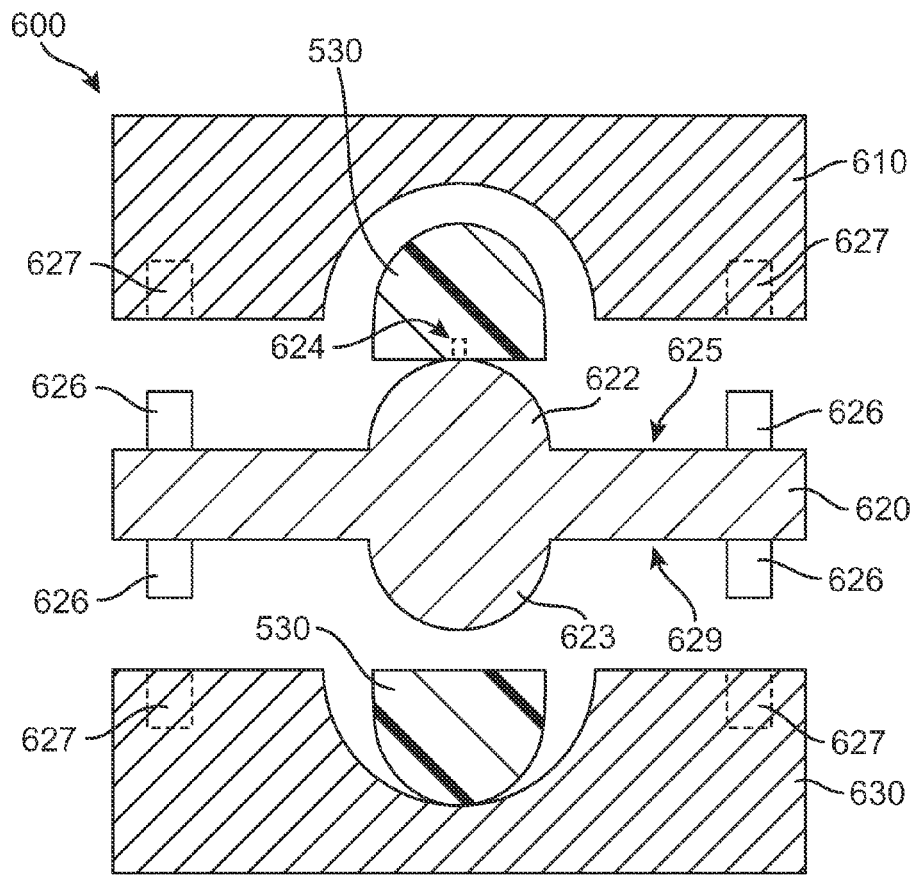
FIG. 5C is a side cross-sectional view of a conventional mold for molding two outer core halves with the mold in an open position.

A mold may also be provided to mold two hemispherical sections in a single compression molding operation. Turning to FIG. 5C, a conventional mold 600 is shown that includes an first mold plate 610, a second mold plate 630, and a midplate 620. Midplate 620 includes a first projection 622 facing first mold plate 610 and a second projection 623 facing second mold plate 630. First projection 622 may include a mechanical fastening device 624 to attach preform 530 to first projection 622 to a degree. Midplate 620 may also include one or more lugs 626 and first mold plate 610 and second mold plate 630 may include recesses 627. First mold plate 610 and second mold plate 630 may move along guide rods, be hinged, or actuated by other devices (not shown) enabling at least one of first mold plate 610 and second mold plate 630 to move relative to the other to close mold 600. Further, at least one of first mold plate 610, second mold plate 630, and midplate 620 may be heated to assist with the deformation of preforms 530 and/or to partially cure the material of preforms 530.

Figure 5D:
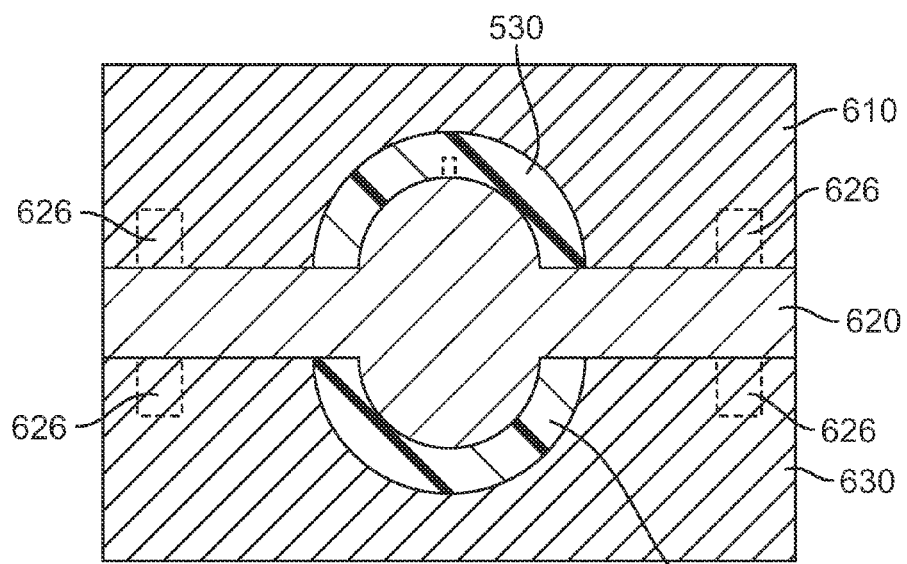
FIG. 5D is a side cross-sectional view of the mold of FIG. 5C in a closed position.

Mold 600 is shown in FIG. 5C in an open position with two preforms 530 having been inserted into mold 600. One preform 530 has been placed upon first projection 622, such as upon mechanical fastening device 624, and another preform 530 has been placed upon second mold plate 630 opposite to second projection 623. As shown in FIG. 5D, mold 600 may be closed by bringing each of first mold plate 610 and second mold plate 630 into contact with midplate 620, causing each of preforms 530 to be deformed between first mold plate 610 and midplate 620 and between second mold plate 630 and midplate 620.

Figure 5E:
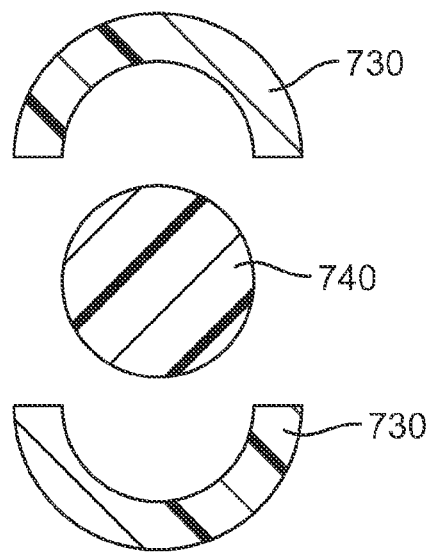
FIG. 5E is a side cross-sectional view of an embodiment of a core with an inner core and two outer core sections.

Due to the shape of the surfaces of the cavities and projections of mold 500 and mold 600, preforms 530 placed within mold 500 and mold 600 are deformed into a particular shape, such as the hemispherical sections 730 shown in FIG. 5E. In other words, each preform 530 may be molded into a hemispherical section 730, with mold 500 producing one hemispherical section 730 at a time and mold 600 producing two hemispherical sections at a time. Such hemispherical sections 730 may have a cup-like shape. Each hemispherical section 730 may, for example, form substantially half of an outer core, such as first outer core 320 of golf ball 300 in FIG. 3 and second outer core layer 430 of golf ball 400 in FIG. 4, that is subsequently molded from two hemispherical sections 730.

Figure 5F:
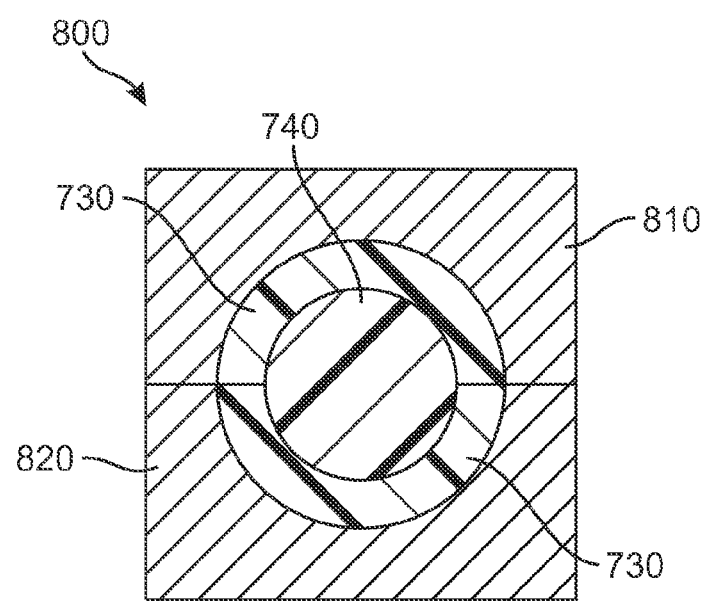
FIG. 5F is a side cross-sectional view of an embodiment of a mold to mold outer core halves and an inner core together.

After two hemispherical sections 730 have been molded, hemispherical sections 730 are arranged to encase a previously molded inner core 740, as shown in FIG. 5E. Hemispherical sections 730 and inner core 740 are then placed in a mold 800 between a first mold section 810 and a second mold section 820, as shown in FIG. 5F, with inner core 740 placed between hemispherical sections 730. First mold section 810 and second mold section 820 are subsequently pressed together to join hemispherical sections 730 to form a completed core, which has an outer core that encases inner core 740, such as outer core 320 of golf ball 300 shown in FIG. 3 or outer core 430 of golf ball 400 shown in FIG. 4. First mold section 810 and second mold section 820 may also be heated to cure or partially cure hemispherical sections 730 and/or inner core 740. In another example, hemispherical sections 730 may be placed within mold 600 with inner core 740 and molded together to form a completed core, such as by removing midplate 620 in mold 600 and molding hemispherical sections 730 and inner core 740 together with first mold plate 610 and second mold plate 630. Such a molding operation may be advantageously conducted in mold 600 without the use of an additional mold, such as mold 800.

An important consideration when molding hemispherical sections 730 in the molds shown in FIGS. 5A-5D is that a preform 530 is properly located and centered within mold 500 and within mold 600 during molding operations. If preform 530 is not properly located within mold 500 or mold 600 during the molding operation, a hemispherical section 730 may be produced that has an unsatisfactory shape.

For instance, a preform 530 placed on top of projection 522 of mold 500 or on top of first projection 622 of mold 600 may move relative to the projection 522 or projection 622. Such a movement is undesired and may result in the formation of a hemispherical section (not shown) having an undesirable shape because preform 530 may be not be centered on projection 522 or first projection 622 and instead located more to one side of projection 522 or projection 622. It also may form a void during molding and curing, particularly when the material is a thermoset. As a result, the molded hemispherical section may be thicker on one side than another, which will cause an inner core to be off-center within the golf ball. In another instance, a hemispherical section 730 may move before or during molding of hemispherical sections 730 about inner core 740 in FIG. 5F, causing inner core 740 to be off-center within the hemispherical sections 730 and within an outer core molded about inner core 740.

Figure 6:
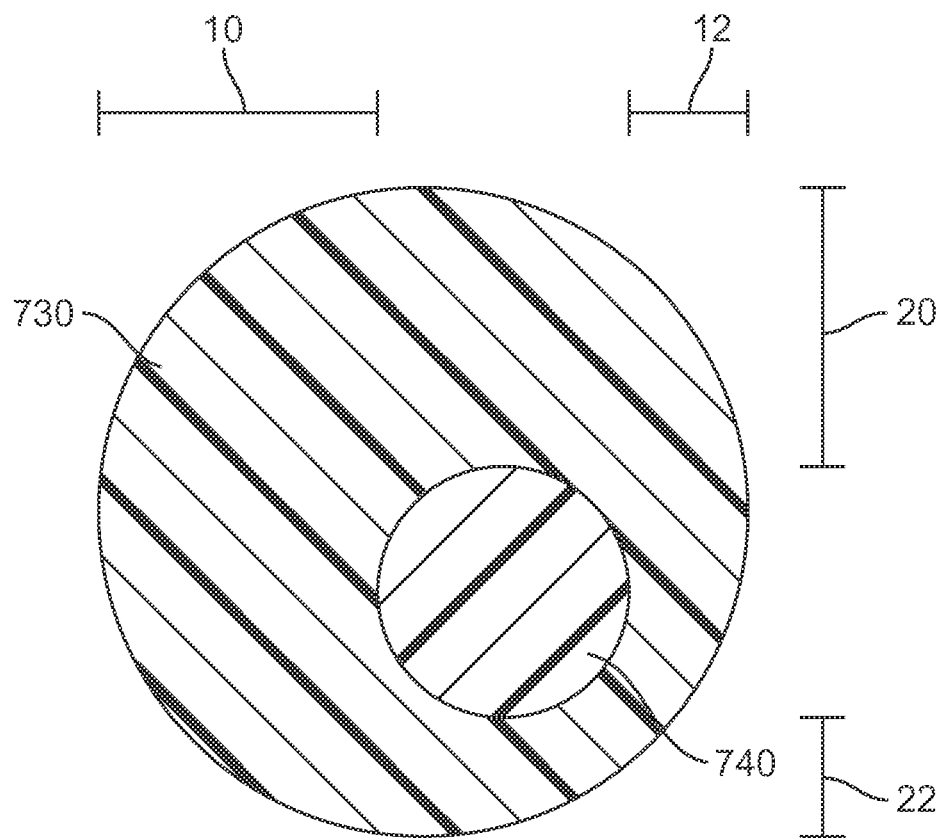
FIG. 6 is a side cross-sectional view of a core with an off-center inner core.

As shown in FIG. 6, an outer core 730 molded from such hemispherical sections around an inner core 740 would cause the inner core 740 to be off-center within outer core 730 so that inner core 740 is not concentric with outer core 730. For instance, distance 10 in FIG. 6 may be greater than distance 12 and distance 20 may be greater than distance 22, with each of distances 10, 12, 20, 22 providing a distance from a surface of inner core 740 to a surface of outer core 730. Such an off-center inner core 740 would likely provide less than optimal results for a golf ball, even when inner core 740 is not as off-center as in the example of FIG. 6, which shows an exaggerated example of an off-center inner core 740 for explanatory purposes.

The embodiments discussed herein advantageously address this issue by providing a machine and method that minimizes or eliminates movement of molding material from its proper position during a molding process. The machine and method may also provide a more efficient process for manufacturing a golf ball, such as by reducing the number of steps in a process of manufacturing a golf ball. One way to address this issue is to include an inner core in the process of molding hemispherical sections for an outer core.

Figure 7:
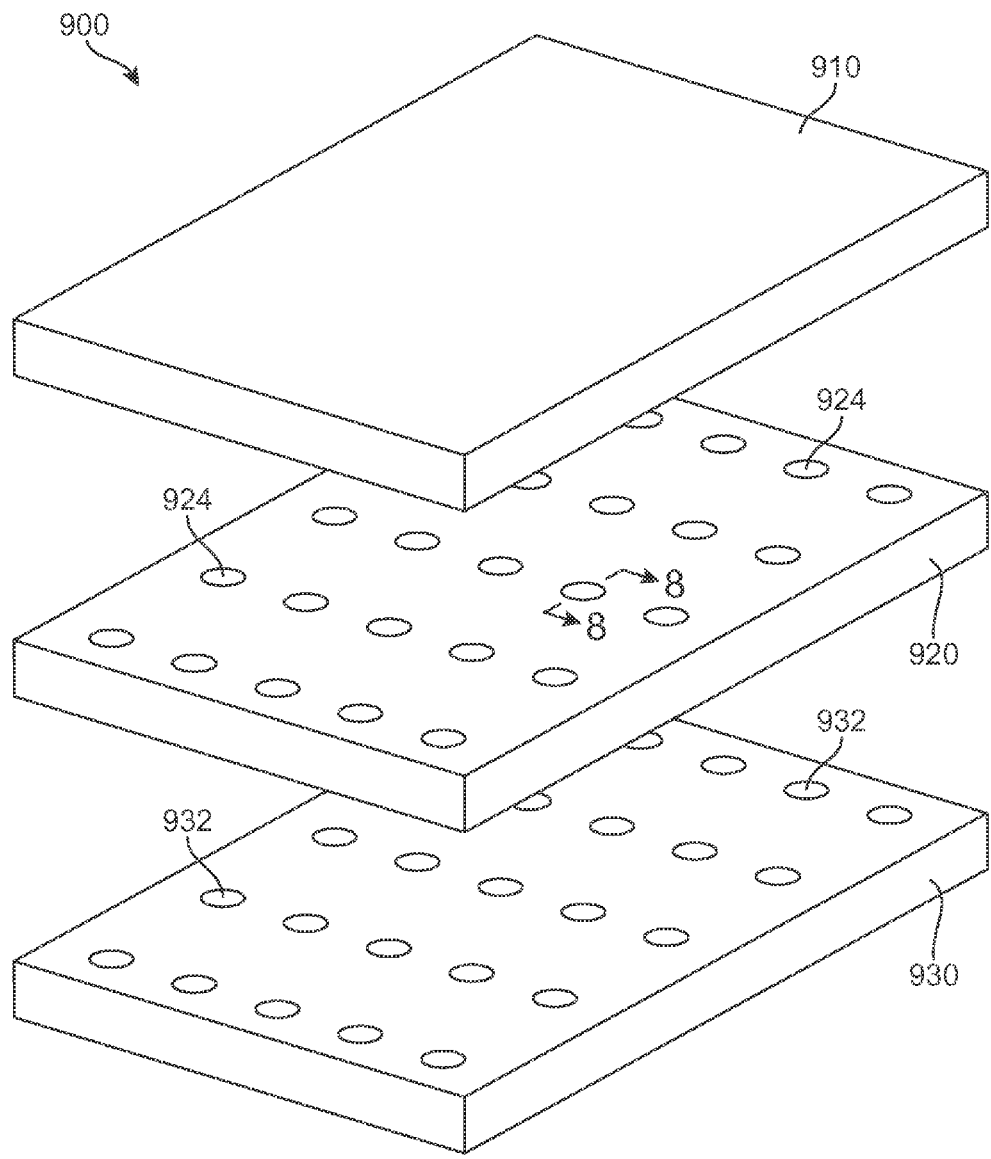
FIG. 7 is a perspective view of an embodiment of a mold.

Turning to FIG. 7, an embodiment of a mold 900 for molding hemispherical sections is shown. Mold 900 includes a first mold plate 910, a second mold plate 930, and a midplate 920. First mold plate 910 and second mold plate 930 may move along guide rods, be hinged, or actuated by other devices (not shown) enabling at least one of first mold plate 910 and second mold plate 930 to move and come into contact with midplate 920 to close mold 900. Any or all of first mold plate 910, second mold plate 930, and midplate 920 may be heated to assist with the deformation of molding material and/or to partially cure the molding material used within mold 900.

Figure 8:
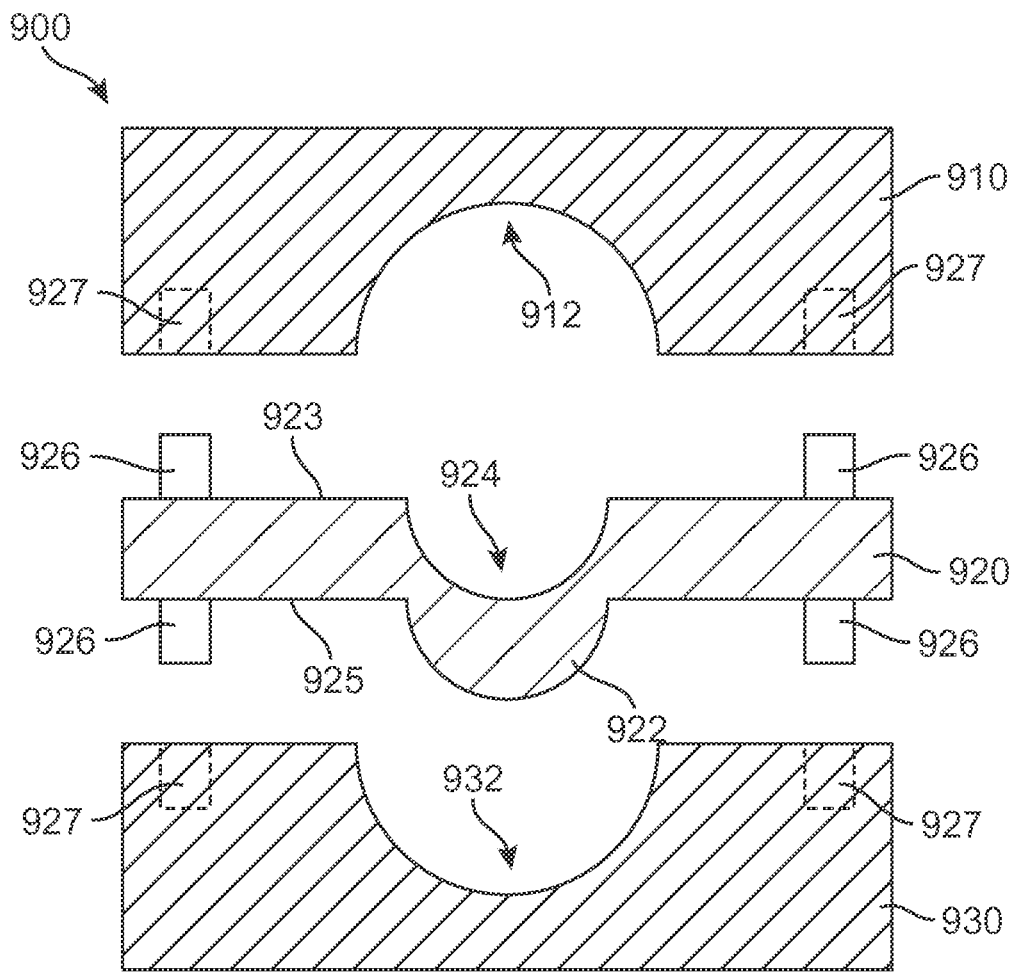
FIG. 8 is a side cross-sectional view taken along line 8-8 in FIG. 7 of an embodiment of a single mold cavity for molding an outer core section with an inner core and molding a second outer core section, where the cavity is in an initial open and empty configuration.

Second molding plate 930 includes cavities 932 and midplate 920 includes indentations 924. Indentations 924 may, for example, be formed as concave recesses in midplate 920. Turning to FIG. 8, a cross-sectional view of one of the indentations 924 of midplate 920 is shown, along with first mold plate 910 and second mold plate 930. As shown in FIG. 8, first mold plate 910 may include a first cavity 912 and cavity 932 of second mold plate may serve as a second cavity. Midplate 920 includes indentation 924 on a first surface 923 of midplate 920, which is located opposite to first cavity 912 of first mold plate 910, as well as a projection 922 on a second surface 925 of midplate 920, which is located opposite to second cavity 932 of second mold plate 930. Projection 922 may, for example, be provided as a generally convex projection on midplate 920. As a result, midplate 920 may include one or more recesses 924 on a first surface 923 and one or more projections 922 on a second surface 925.

First cavity 912 of first mold plate 910 corresponds to indentation 924 so that first cavity 912 and indentation 924 provide a space to mold a hemispherical section with an inner core (not shown) when first mold plate 910 and midplate 920 are brought into contact when mold 900 is closed during a compression molding operation. Second cavity 932 of second mold plate 930 corresponds to projection 922 of midplate 920 to provide a space for molding a hemispherical section (not shown), so that projection 922 is inserted into cavity 932 when midplate 920 and second mold plate 930 are brought into contact when mold 900 is dosed during a compression molding operation.

Midplate 920 may also include one or more lugs 926 and recesses 927. In another example, lugs 926 may be located on first mold plate 910 and on second mold plate 930 and recesses 927 on midplate 920, or lugs 926 and recesses 927 may be located on all of first mold plate 910, second mold plate 930, and midplate 920.

Figure 9:
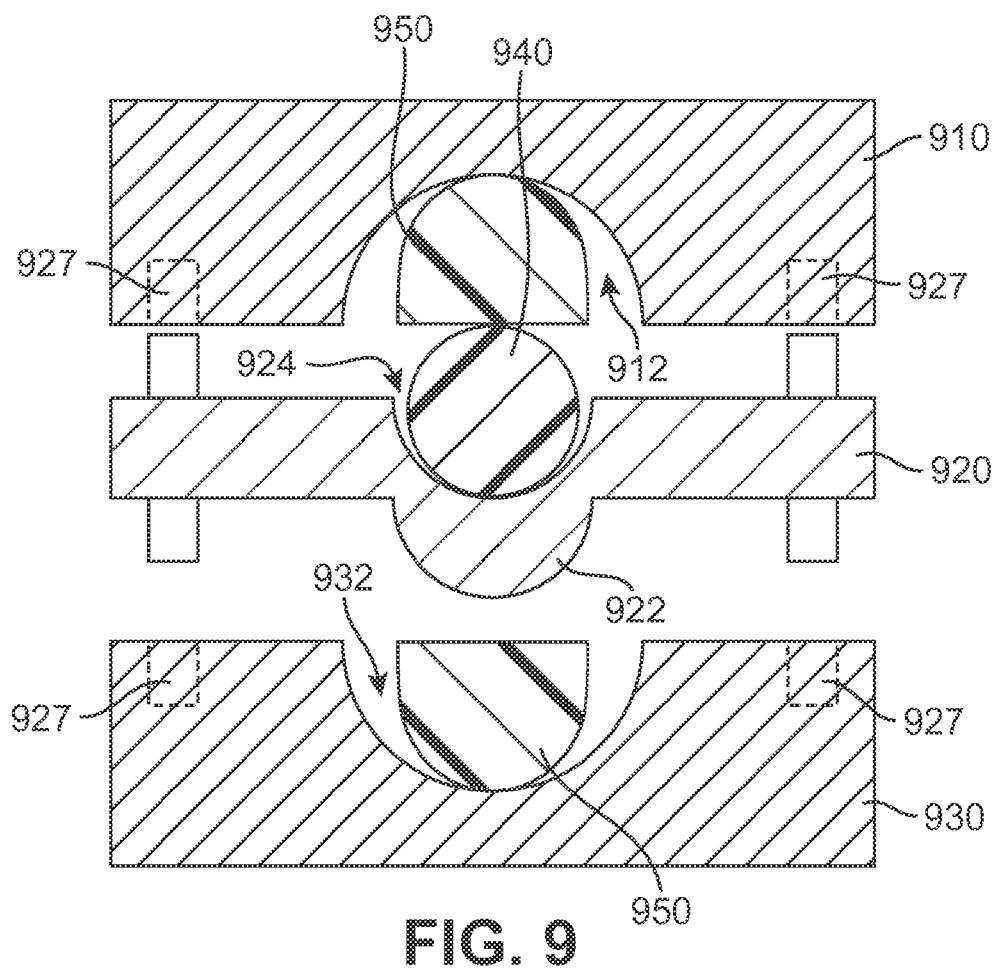
FIG. 9 is a side cross-sectional view of the mold cavity of FIG. 8 after preforms and an inner core have been introduced.

As shown in the example of FIG. 9, a preform 950 may be placed within first cavity 912 of first mold plate 910 and a preform 950 may be placed within second cavity 932 of second mold plate 930, such as by an operator. In addition, an inner core 940 is placed within in mold 900. In particular, inner core 940 may be placed within indentation 924 of midplate 920. This is done so that a hemispherical section may be molded about inner core 940, such as by molding preform 930 placed within cavity 912, about inner core 940 when mold 900 is closed during a compression molding operation.

To further assist with positioning of preform 950 within first cavity 912 of first mold plate 910, preform 950 may be placed in direct contact with inner core 940. Such an arrangement may advantageously assist with positioning of preform 950 within first cavity 912 and assist with centering of inner core 940 during the molding process.

For example, inner core 940 may first be placed within indentation 924 of midplate 920 and then preform 950 may be placed on top of inner core 940, with direct contact between preform 950 and inner core 940, as shown in the example of FIG. 9. Direct contact between preform 950 and inner core 940 may be provided by a center of the surface of preform 950 facing inner core 940 (a first surface) coming into direct contact with inner core 940, as shown in FIG. 9. Further, a perimeter of the surface of preform 950 facing inner core 940, which may extend around the center of the surface, may initially not be in contact with inner core 940, as shown in FIG. 9. As a result, the center of the surface of preform 950 facing inner core 940 may be in direct contact before the perimeter of the surface comes into direct contact with inner core 940. Preform 950 may have a surface facing first cavity 912 (a second surface) which contacts first cavity 912 when preform 950 is placed within the cavity 950. Thus, first mold plate 910 may be closed upon preform 950 so that preform is placed within first cavity 912 of first mold plate 910, with preform 950 in direct contact with both first mold plate 910 and inner core 940, as shown in FIG. 9.

In another example, deformation of preform 950 does not occur until after direct contact has been made between preform 950 and inner core 940. Deformation of preform 950 may not occur, for example, until after direct contact is made between first mold plate 910 and preform 950, and between inner core 940 and preform 950. After direct contact has been made between preform 950 and inner core 940, molding may begin by commencing deformation of preform 950.

By molding a hemispherical section directly onto inner core 940 within mold 900, inner core 940 itself may serve as a molding surface for molding a preform 950 into a hemispherical section. For example, inner core 940 may cooperate with midplate 920 and first cavity 912 of first mold plate 910 to provide mold surfaces that deform preform 950 into a hemispherical section. Inner core 940 may be substantially spherical and therefore provide a mold surface that forms a cup-like shape or indentation within a hemispherical section molded onto inner core 940.

Because inner core 940 itself is used to deform and mold preform 950 into a hemispherical section about inner core 940, a hemispherical section may be more reliably produced so that inner core 940 is properly centered within the hemispherical section and has a desired concentricity with the hemispherical section. For example, because inner core 940 is placed and seated within indentation 924 of midplate 920, movement of inner core 940 is limited or eliminated so that the inner core 940 does not move to an extent that substantially affects the centering of inner core 940 within the molded hemispherical section. Similarly, because preform 950 is placed within first cavity 912 of first mold plate 910, movement of preform 950 relative to inner core 940 is limited or eliminated so that a hemispherical section molded from preform 950 is properly positioned about inner core 940. In addition, a molding process may be made more efficient by reducing the separate handling of hemnispherical sections and an inner core by molding a hemispherical section directly onto inner core 940 so that the hemnispherical section and inner core 940 are produced as a single piece. As a result, inner core 940 and the molded hemispherical section do not need to be handled separately.

Figure 10:
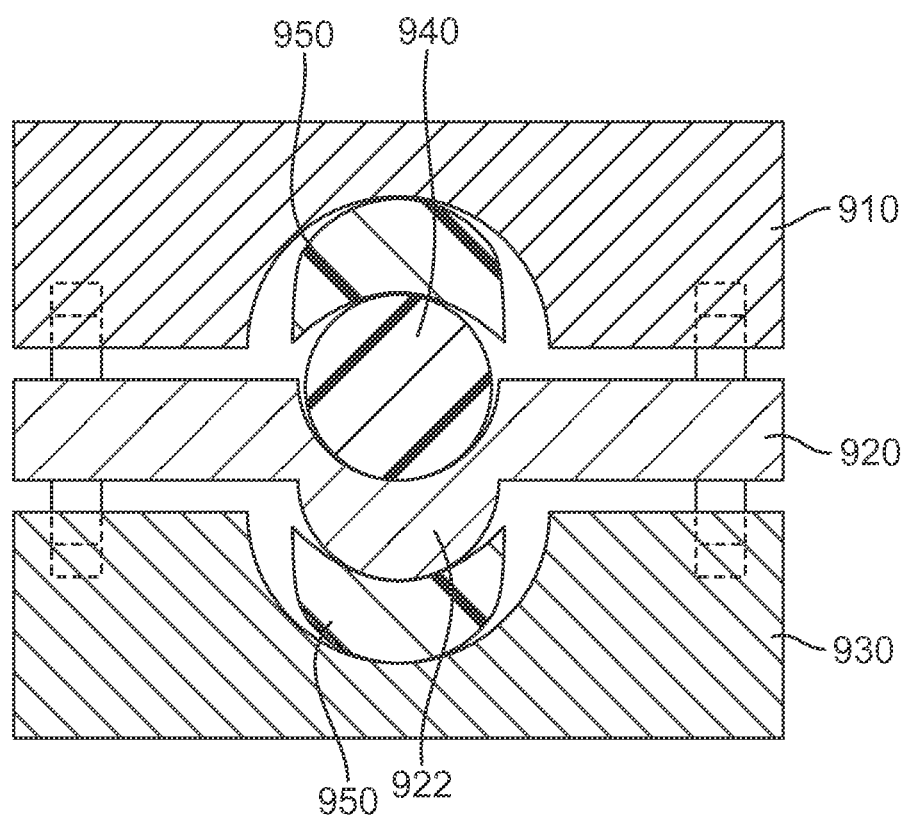
FIG. 10 is a side cross-sectional view of the mold cavity of FIG. 9 after the mold has been partially closed around the preforms and the inner core.

After preform 950 has been placed between first mold plate 910 and midplate 920 and preform 950 has been placed between midplate 920 and second mold plate 930, first mold plate 910 and midplate 920 may be brought together and second mold plate 930 and midplate 920 may be brought together to commence a compression molding operation to mold preforms 950 into two hemispherical sections, with preform 950 placed within first cavity 912 being molded onto inner core 940. During the molding operation, first mold plate 910, second mold plate 930, and midplate 920 may move relative to one another. For example, as shown in FIG. 10, as mold 900 partially closes, preform 950 within cavity 912 of first mold plate 910 will press against inner core 940, causing preform 950 to be deformed and molded about inner core 940. Preform 950 within cavity 932 of second mold plate 930 will come into contact with projection 922 of midplate 920, causing preform 950 be deformed and molded about projection 922. This causes the two preforms 950 to be deformed and molded into similar shapes, but with inner core 940 causing preform 950 placed in first cavity 912 to be molded with a cup-like shape, while preform 950 placed in second cavity 932 is molded with a cup-like shape by projection 922.

Figure 11:
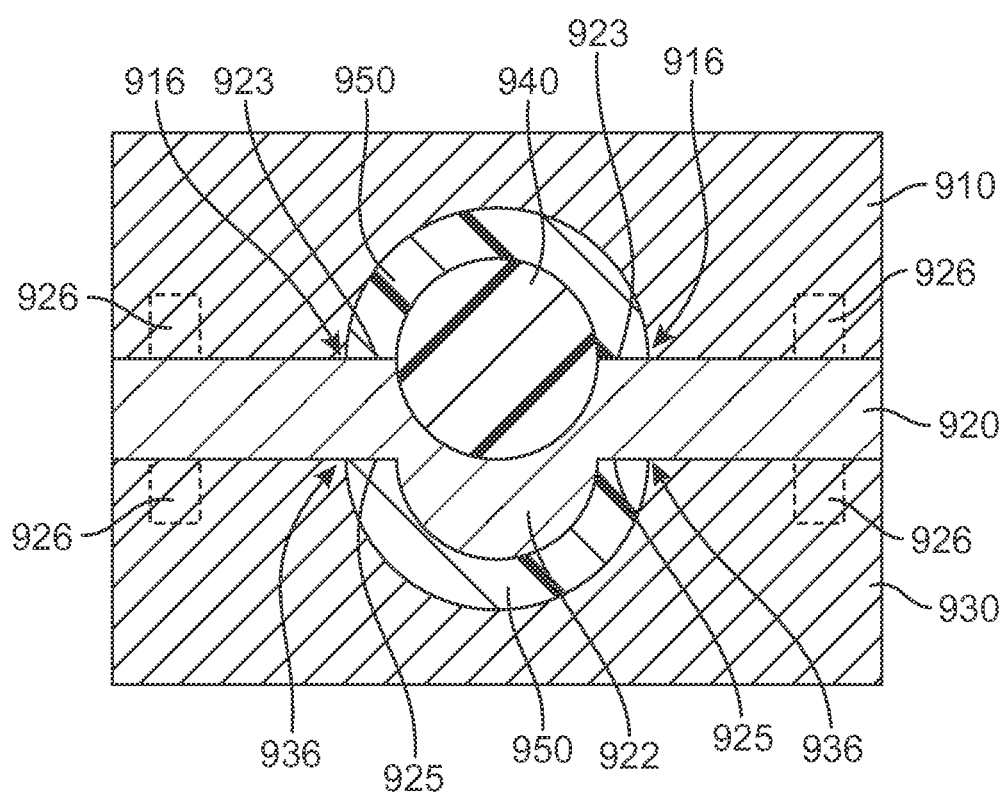
FIG. 11 is a side cross-sectional view of the mold cavity of FIG. 10 after the mold has been fully closed.

Turning to FIG. 11, mold 900 is completely closed with a pre-selected applied pressure to complete the compression molding of preforms 950 into hemispherical sections, with preform 950 within cavity 912 of first mold plate 910 being molded about and joined to inner core 940. In this position, first mold plate 910 may come into contact (directly with one another or indirect via lugs 926) with, and press against, midplate 920, Second mold plate 930 may also come into contact (direct or indirect via lugs 926) with, and press against, midplate 920.

To promote engagement between midplate 920 and first mold plate 910, first surface 923 of midplate 920 may be substantially flat. For example, first surface 923 may be substantially planar to provide a substantially flat surface. In another example, first surface 923 may be without projections or indentations, except for the presence of one or more indentations 924. In such a case, the substantially flat portion of first surface 923 may extend between indentations 924 without projections or indentations. In another example, a substantially flat surface may be a machined molding surface having a surface roughness typically used for a molding surface of a mold, which has a substantially flat, smooth surface without macroscopic projections or indentations, but includes the microscopic peaks and valleys present in the inherent roughness of a machined surface. If midplate 920 includes lugs 926 to position midplate 920 and first mold plate 910, as shown in FIG. 8, first surface 923 may be extend in a flat, substantially planar manner without projections or indentations between indentations 924 and lugs 926. Th first surface 923 may match with an opposing surface of first mold plate 910 so that these surfaces may come into direct, planar contact, as shown in FIG. 11.

Further, to advantageously promote shaping of preform 950 in a desired manner within mold 900, the portion of first surface 923 located within first cavity 912 of first mold plate 910 may be substantially flat and without projections or indentations about indentation 924, as shown in FIG. 11. The portion of first surface 923 that is substantially flat may form a surface against which preform 950 is molded within first cavity 912. For example, the portion of first surface 923 that is substantially flat may extend from indentation 924 to a location 916 where midplate 920 and first mold plate 910 come into contact when mold 900 is dosed, as shown in FIG. 11. Further, the portion of first surface 923 may extend radially outward from indentation 924 to location 916 where midplate 920 and first mold plate 910 come into contact when mold 900 is dosed. In other words, indentation 924 may be surrounded by the substantially flat portion of first surface 923, from indentation 924 to where midplate 920 and first mold plate 910 come into contact when mold 900 is closed.

If first surface 923 is not substantially flat, first surface 923 could include projections or indentations that affect the molded shape of preform 950. Indentations or protrusions formed on preform 950 by first surface 923 of midplate 920 could potentially form voids or other undesired structures during molding of preform 950 into an outer core of a golf ball. By providing a substantially flat first surface 923 within first cavity 912 about indentation 924, where preform 950 is molded, as shown in FIG. 11, preform 950 may be advantageously formed against first surface 923 of midplate 920 with a minimal amount of indentations or protrusions.

Similarly, second surface 925 of midplate 920 may be substantially flat. For example, second surface 925 may extend in a flat, substantially planar manner. In another example, second surface 925 may be substantially flat and without projections or indentations, except for one or more projections 922. If midplate 920 includes lugs 926 to position midplate 920 and second mold plate 930, as shown in FIG. 8, second surface 925 may extend in a substantially flat manner between projections 922 and lugs 926. Such an arrangement may advantageously promote direct, planar contact between second surface 925 and the opposing surface of second mold plate 930, as shown in FIG. 11.

Further, to advantageously promote shaping of preform 950 in a desired manner within mold 900, the portion of second surface 925 located within second cavity 932 of second mold plate 930 may be substantially flat and without projections or indentations about projection 922, as shown in FIG. 11. The portion of second surface 925 that is substantially flat may form a surface against which preform 950 is molded within second cavity 932. For example, the portion of second surface 925 that is substantially flat may extend from projection 922 to a location 936 where midplate 920 and second mold plate 930 contact when mold 900 is closed, as shown in FIG. 11. Further, such a portion of second surface 925 may extend radially outward from projection 922 to location 936 where midplate 920 and second mold plate 930 contact when mold 900 is closed. In other words, projection 922 may be surrounded by the substantially flat portion of second surface 925, from projection 922 to where midplate 920 and second mold plate 930 contact when mold 900 is closed. In another example, the substantially flat portion of first surface 923 and the substantially flat portion of second surface 925 may be substantially parallel to one another.

If second surface 932 is not substantially flat, second surface 932 could include projections or indentations that affect the molded shape of preform 950. Indentations or protrusions formed on preform 950 by second surface 932 of midplate 920 could potentially form voids or other undesired structures during molding of preform 950 into an outer core of a golf ball. By providing a substantially flat second surface 932 within second cavity 932 about projection 922, where preform 950 is molded, as shown in FIG. 11, preform 950 may be advantageously formed against second surface 932 of midplate 920 with a minimal amount of indentations or protrusions.

According to an embodiment, in the case that first mold plate 910 directly contacts midplate 920 (such as when lugs 926 are not present), a gap may be formed between first mold plate 910 and midplate 920, within which preform 950 may be deformed and molded into a hemispherical section about inner core 940. Similarly, second mold plate 930 and midplate 920 may also come into direct contact, with a gap formed in between, within which preform 950 may be deformed and molded into a hemispherical section.

Figure 12:
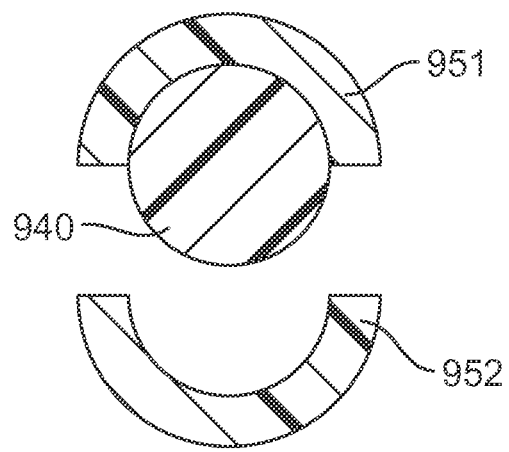
FIG. 12 is a side cross-sectional view of the products of the mold of FIGS. 7-11.

Once the molding process is complete and preform 950 placed within first cavity 912 has been molded into a hemispherical section about inner core, such as hemispherical section 951 about inner core 940 shown in FIG. 12, which have been joined into a single piece. The molding process also molds preform 950 placed within second cavity 932 into hemispherical section 952 that is separate from hemispherical section 951 and inner core 940, as shown in FIG. 12.

Subsequently, hemispherical section 951 with inner core 940 is placed within a cavity 963 of a mold 960, such as within a second mold plate 964. Because hemispherical section 951 and inner core 940 have been molded together as a single piece, inner core 940 does not have to be carefully within hemispherical section 951 so that inner core 940 is properly centered within hemispherical section 951. Instead, the molding process described above has provided hemispherical section 951 and inner core 940 as a single, molded piece with inner core 940 already centered within hemispherical section 951. Hemispherical section 952 is separately placed within mold 960, such as within first mold plate 962. Alternatively, hemispherical section 951 and inner core 940 may be placed within first mold plate 962 and hemispherical section 952 may be placed within second mold plate 964. As shown in FIG. 13B, mold 960 may then be closed to mold hemispherical section 951 and hemispherical section 952 together about inner core 940. Mold 960 may also be heated to at least partially cure hemispherical sections 951, 952 and/or inner core 940. This molding process produces a dual core including inner core 940 and an outer core 970 formed from hemispherical sections 951, 952, as shown in FIG. 13C. In another example, hemispherical sections 951, 952 and inner core 940 may be molded together using mold 900 by removing midplate 920 and molding hemispherical sections 951, 952 and inner core 940 together between first mold plate 910 and second mold plate 930. Such a process may be advantageously conducted in mold 900 without the use of an additional mold, such as mold 960.

Figure 14:
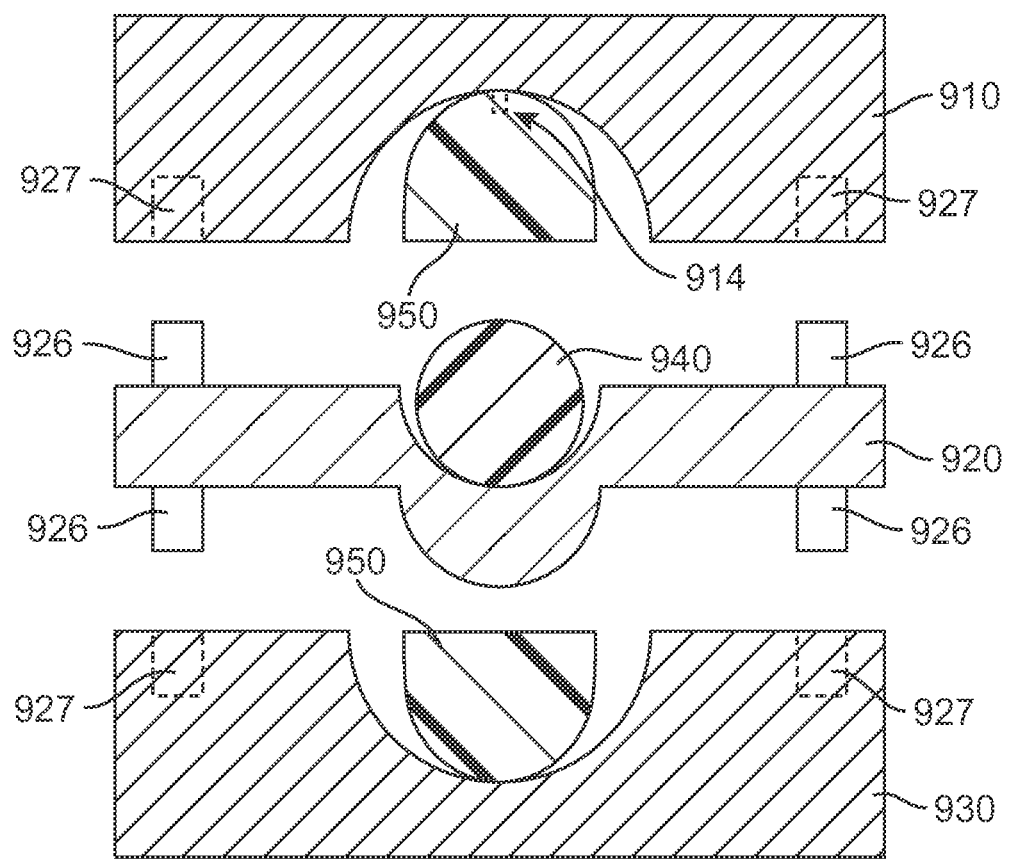
FIG. 14 is a side cross-sectional view of another embodiment of a single mold cavity for molding an outer core section with an inner core and molding a second outer core section, where the cavity is in an initial open and empty configuration.

Other configurations and examples may be employed for the embodiment discussed above. As shown in FIG. 14, first mold plate 910 may include a mechanical fastening device 914 to attach preform 950 within cavity 912 of first mold plate 910, at least to a degree. For instance, mechanical fastening device 914 may be a pin that penetrates the material of preform 950, as shown in FIG. 14, although other fastening devices may be used. In particular, mechanical fastening device 914 may be used if preform 950 is not cured or is partially cured. Mechanical fastening device 914 may, for example, assist with maintaining the position of preform 950 when first mold plate 910 is positioned above midplate 920 in a vertical direction, so that preform 950 does not fall out of first cavity 912 of first mold plate 910 before a compression molding operation commences. In another example, preform 950 may be placed within mold 900 without the use of mechanical fastening device 914.

Figure 15:
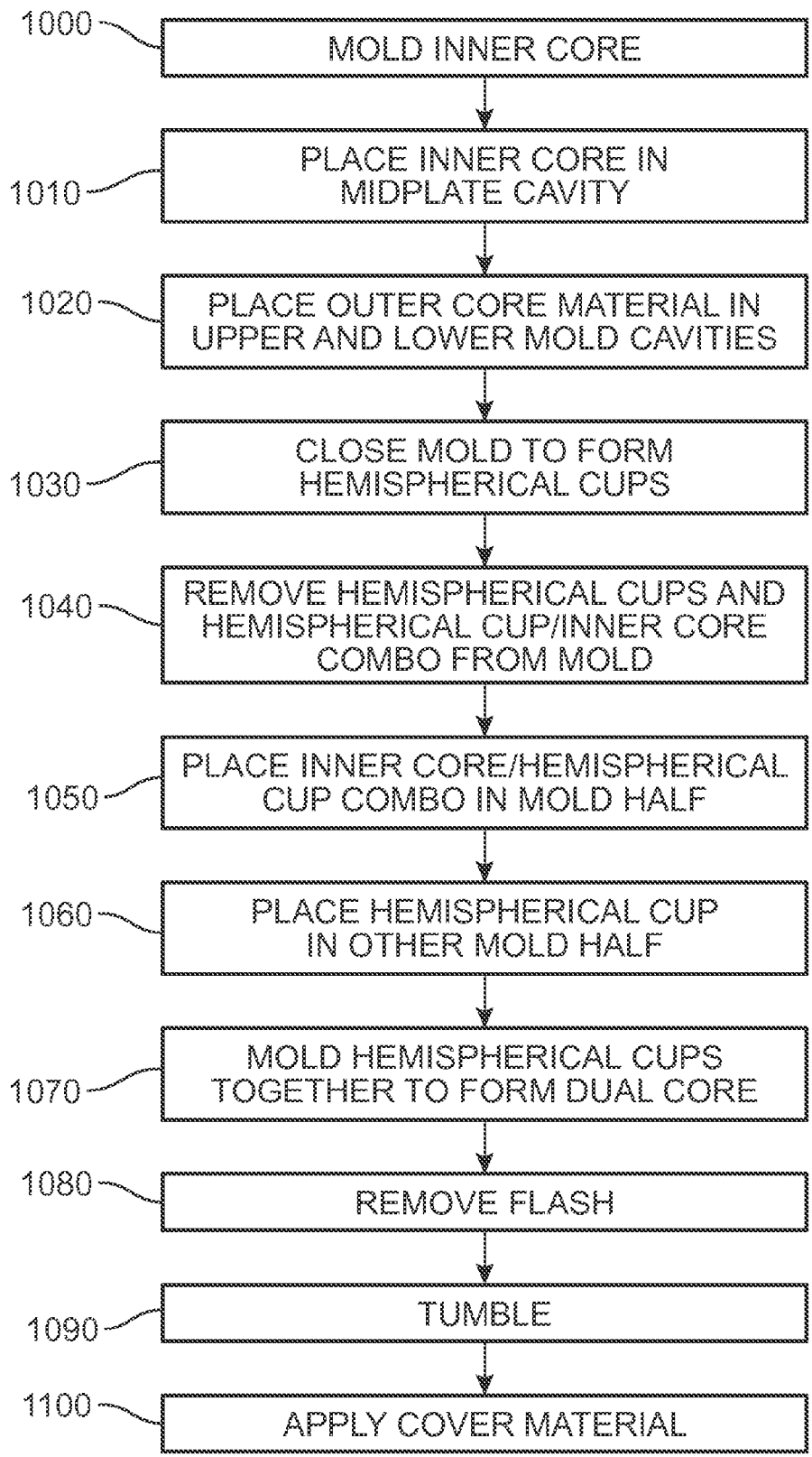
FIG. 15 is a schematic view of a method of manufacturing a golf ball.

Turning to FIG. 15, a process of manufacturing a golf ball is shown. The process may include any of the features and embodiments of the molds and processes described herein and additional steps and features not described below may also be included. In a first step 1000 of the process, an inner core is molded using any technique known in the art. Step 1000 may be, for example, an injection molding process or a compression molding process. The inner core may be, for example, a thermoplastic material. For instance, the inner core may consist essentially of a thermoplastic polymer or a rubber. A thermoplastic polymer may be, for example, a highly neutralized polymer. In another instance, the inner core may be made of a thermoplastic material and include no other types of materials other than thermoplastic materials. In a further example, the polymer may be HPF 2000. In another example, the inner core may consist essentially of a thermoset material, such as a rubber composition.

In a following step 1010, the inner core is placed in a midplate cavity, such as indentation 924 of midplate 920 in FIG. 9. Subsequently, in step 1020, outer core material is placed in upper and lower mold cavities. For example, a preform 950 may be placed within first cavity 912 of first mold plate 910 and a preform 950 may be placed within second cavity 932 of second mold plate 930 in FIG. 9. In another example, a preform 950 may be placed within second cavity 932 of second mold plate 930 and a preform 950 may be placed on top of inner core 940, which is located on midplate 920.

The outer core material, such as the material of preform 950, may be a thermoset material. In one embodiment, the outer core material may be a rubber composition, such as a high cis polybutadiene rubber. The preform 950 may be uncured prior to be placed within the cavities of the mold sections.

In a subsequent step 1030, the mold is closed to form hemispherical cups or sections from the outer core materials, such as preforms 950, as shown in FIGS. 10 and 11. One of the hemispherical sections is molded about the inner core in step 1030. In step 1030, the outer core material may be partially cured to provide partially cured hemispherical sections. In step 1040, the molded hemispherical sections, including the combined inner core/hemispherical section, are removed from the mold. Alternatively, in step 1040, hemispherical sections and the inner core may be molded together within the mold used to mold the hemispherical sections without the use of an additional mold. Thus, steps 1010-1040 may form steps for molding hemispherical sections for a dual core including an inner core and an outer core.

Figure 13A:
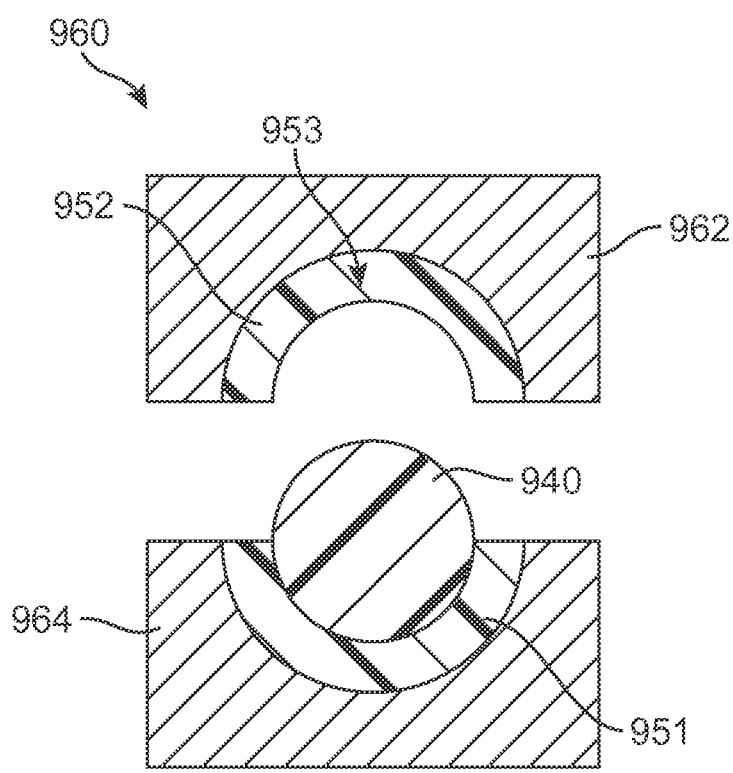
FIG. 13A is a side cross-sectional view of an embodiment of a mold to mold a hemispherical section/inner core combination with another hemispherical section, with the mold in an open position.
Figure 13B:
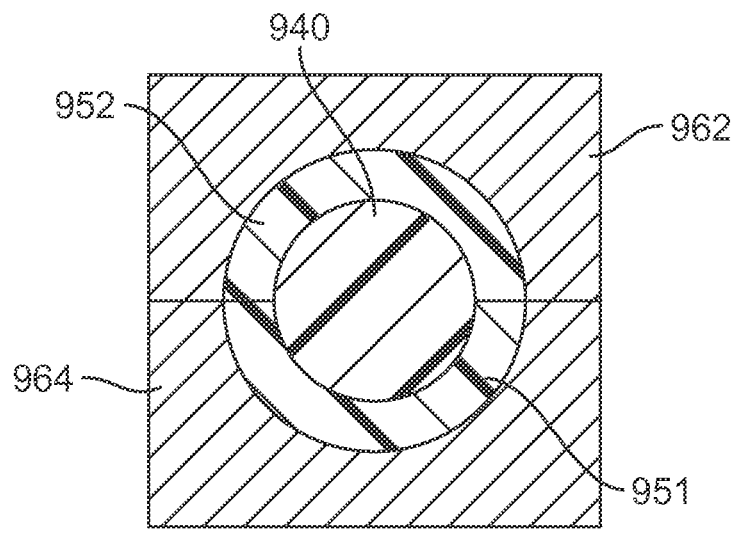
FIG. 13B is a side cross-sectional view of the mold of FIG. 13A in a dosed position.
Figure 13C:
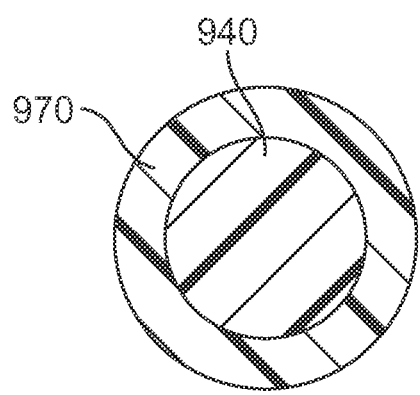
FIG. 13C is a side cross-sectional view of a molded golf ball core, which includes an outer core and an inner core.

In step 1050, the molded hemispherical section/inner core is placed into a mold half, such as in second mold plate 964 in FIG. 13A. In step 1060, a separate hemispherical section is placed into the other mold half, such as in first mold plate 962 in FIG. 13A. Subsequently, in step 1070, the mold plates are closed together to form a dual core including an inner core and outer core, as shown in FIGS. 13B and 13C. Thus, steps 1000-1070 may form steps for making dual core with inner core and outer core.

The dual corer may then be processed to produce a golf ball. For example, in step 1080 any flash present from the molding process of step 1070 is removed and in step 1090 the surface of the dual core may be tumbled so that the surface of the dual core is roughened to promote adherence of additional layers to the dual core. Finally, in step 1100, cover material is applied to the dual core to produce a golf ball, although other materials and layers may be applied to the dual core before applying the cover material.

While various embodiments of the invention have been described, the description is intended to be exemplary, rather than limiting and it will be apparent to those of ordinary skill in the art that many more embodiments and implementations are possible that are within the scope of the invention. Further, any element of any embodiment discussed or described herein may be used or adapted for use in any other embodiments described herein unless specifically limited in the description. Accordingly, the invention is not to be restricted except in light of the attached claims and their equivalents. Also, various modifications and changes may be made within the scope of the attached claims.

What is claimed is:

1. A method of manufacturing a golf ball, the method comprising:
   placing an inner golf ball core into an indentation of a first side of a midplate;
   suspending a first preform within a cavity of a first mold plate via a mechanical fastening device of the first mold plate projecting into the first mold plate cavity, the suspended first preform facing the placed core;
   placing a second preform into a cavity of a second mold plate, the placed second preform facing a projection of the midplate projecting from a second side thereof; and
   closing the first and second mold plates against the first and second midplate sides, respectively, so as to mold the first and second preforms into hemispherical shapes against the core and projection, respectively, the first preform successively contacting the core and midplate during said closing.

2. The method of claim 1, further comprising:
   removing the midplate after said closing; and
   closing the first and second mold plates again so as to mate the hemispherical first and second preforms and encapsulate the core.

3. The method of claim 1, further comprising extruding the first preform into an extruded shape.

4. The method of claim 3, further comprising maintaining the first preform in the extruded shape prior to said closing.

5. The method of claim 1, further comprising forming the first preform prior to said suspending.

6. The method of claim 5, wherein said forming of the first preform includes providing the first preform with an arcuate surface and a substantially flat surface formed on an opposite preform side from the arcuate surface.

7. The method of claim 6, wherein said suspending of the first preform includes attaching the first preform to the mechanical fastening device at the arcuate surface.

8. The method of claim 7, wherein said suspending of the first preform includes positioning the first preform so that the substantially flat surface faces the core.

9. The method of claim 1, wherein said closing includes joining the core and molded first preform as a single piece.

10. The method of claim 9, wherein said closing includes molding the second preform into a hemispherical section that is separate from the joined core and molded first preform.

11. The method of claim 10, further comprising:
    removing the midplate after said closing; and
    closing the first and second mold plates again so as to mate the hemispherical second preform with the joined first preform and core, thereby encapsulating the core.

12. The method of claim 11, further comprising molding at least one additional layer onto the encapsulated core.

13. The method of claim 1, wherein said suspending of the first preform includes inserting the mechanical fastening device into the first preform.

14. The method of claim 13, wherein said inserting includes inserting a pin into the first preform.

* * * * *